United States Patent
Klinger et al.

(10) Patent No.: US 6,199,916 B1
(45) Date of Patent: Mar. 13, 2001

(54) SPIN WELDED FLUID CONNECTOR

(75) Inventors: Gary O. Klinger, Warren; Gary S. Zelinski, Sterling Heights; David C. Stieler, Lake Orion, all of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/874,755

(22) Filed: Jun. 13, 1997

Related U.S. Application Data

(60) Provisional application No. 60/046,522, filed on May 15, 1997.

(51) Int. Cl.$^7$ ............................. F16L 47/02; B29C 65/06
(52) U.S. Cl. ....................... 285/288.1; 264/68; 156/73.5; 228/112.1; 285/21.1; 285/319; 285/331; 285/55; 285/222.1
(58) Field of Search ...................... 285/319, 331, 285/55, 222.1, 222.2, 222.4, 21.1, 22, 288.4, 288.1, 290.1, 293.1; 264/68; 156/73.5; 228/112.1, 154

(56) References Cited

U.S. PATENT DOCUMENTS

| | | |
|---|---|---|
| 2,933,428 | 4/1960 | Mueller . |
| 3,501,110 * | 3/1970 | Hopgood et al. ...................... 264/68 |
| 3,980,248 | 9/1976 | Minoshima . |
| 4,047,739 * | 9/1977 | Aitken ................................ 285/21 |
| 4,097,076 * | 6/1978 | Wackenreuther et al. ........... 285/423 |
| 4,119,334 | 10/1978 | Steed . |
| 4,353,761 * | 10/1982 | Woerz et al. ...................... 156/73.5 |
| 4,784,409 | 11/1988 | Piechowiak . |
| 4,844,512 | 7/1989 | Gahwiler . |
| 4,892,227 * | 1/1990 | MacLaughlin .................... 156/73.5 |
| 5,090,745 | 2/1992 | Kluger . |
| 5,152,855 | 10/1992 | Jansman et al. . |
| 5,284,184 | 2/1994 | Noone et al. . |
| 5,339,867 | 8/1994 | Iorio et al. . |
| 5,383,087 | 1/1995 | Noone et al. . |
| 5,460,771 | 10/1995 | Mitchell et al. . |
| 5,469,892 | 11/1995 | Noone et al. . |
| 5,472,754 * | 12/1995 | Douchet et al. ................... 138/141 |
| 5,524,673 | 6/1996 | Noone et al. . |
| 5,542,712 | 8/1996 | Klinger et al. . |
| 5,566,720 | 10/1996 | Cheney et al. . |
| 5,590,691 | 1/1997 | Iorio et al. . |
| 5,636,875 * | 6/1997 | Wasser ............................. 285/331 |

FOREIGN PATENT DOCUMENTS

| | | | |
|---|---|---|---|
| 3903551 | 8/1989 | (DE) . | |
| 97/17188 | 5/1997 | (DE) . | |
| 2737548 * | 7/1995 | (FR) . | |
| 1233292 * | 10/1986 | (JP) .................................. 156/73.5 |
| 62-009937 | 1/1987 | (JP) . | |
| 7011090 * | 1/1972 | (NL) .................................. 156/73.5 |
| 9415137 * | 7/1994 | (WO) ................................. 285/21 |

* cited by examiner

*Primary Examiner*—Eric K. Nicholson
(74) *Attorney, Agent, or Firm*—Peter H. VanWinkle

(57) ABSTRACT

A joint between a fluid connector body and a plastic tube is formed at least in part by spin welding, wherein the portion of the connector which is configured to receive the tube defines inner and outer surfaces which engage the inner and outer surfaces of the mating tube to create redundant circumferentially continuous seals between the fluid passageway and the outside environment. The use of multi-layer co-extruded plastic tubing having intermediate or bonding layers is particularly advantageous inasmuch as separate inner and outer seals are established between the connector housing and the inner and outer tubing layers, respectively, to ensure that neither system fluids nor foreign contaminants are exposed to the intermediate tube layers, thereby preventing capillary adsorption or delamination.

16 Claims, 3 Drawing Sheets

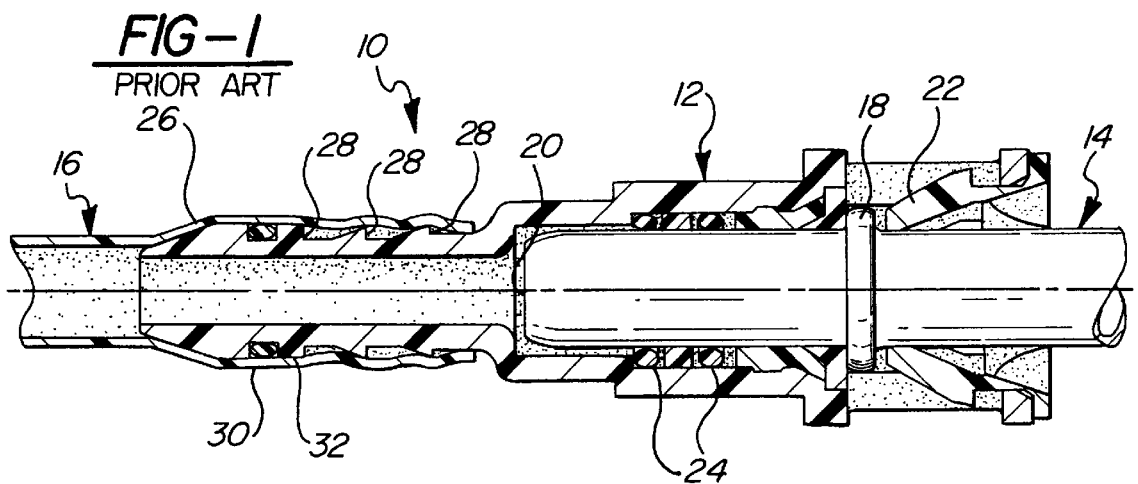
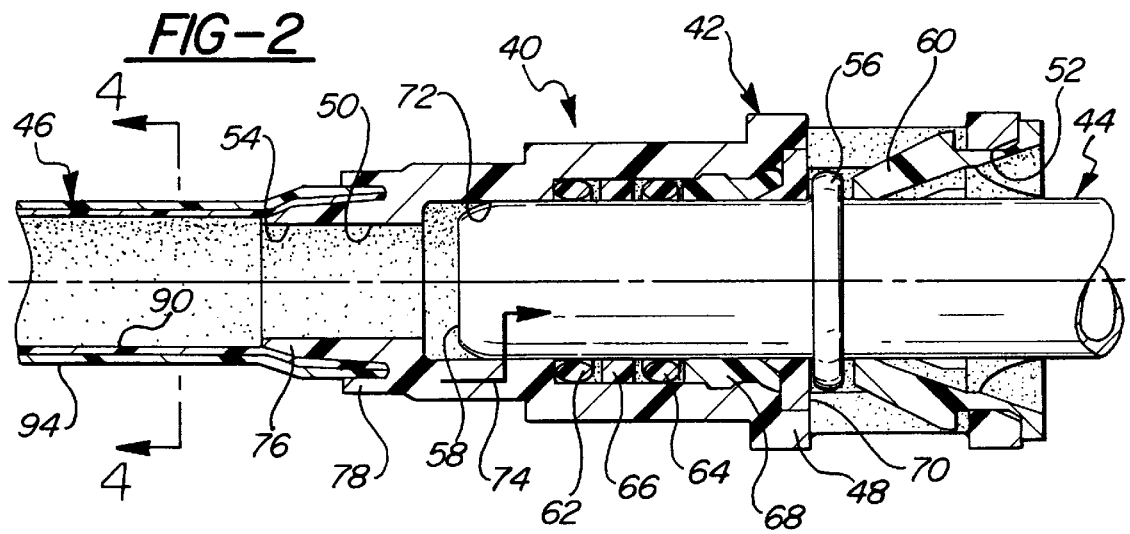
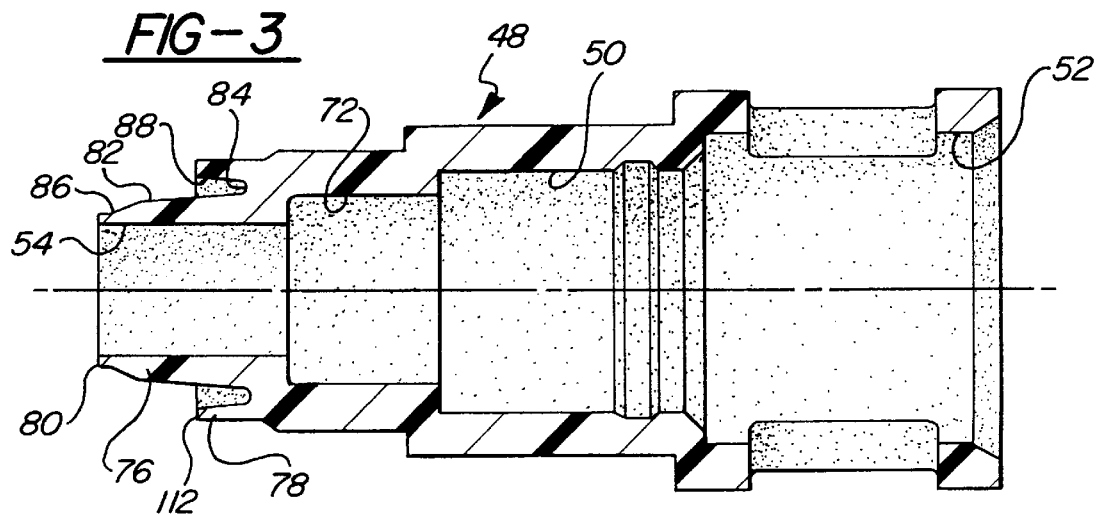

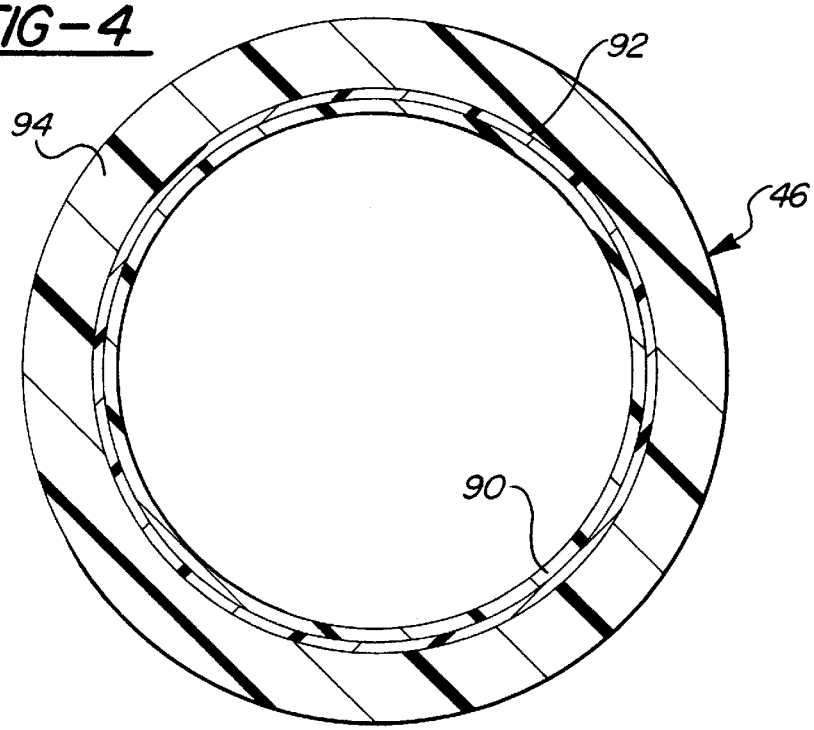
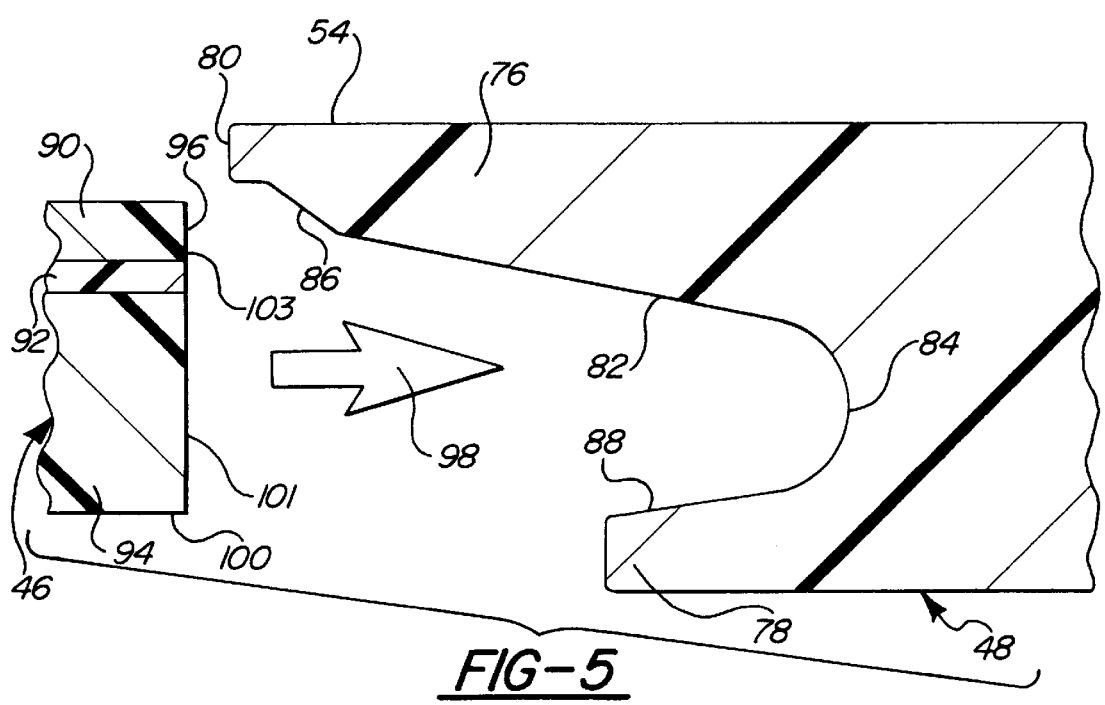

SPIN WELDED FLUID CONNECTOR

CROSS-REFERENCE TO RELATED APPLICATIONS

This application claims benefit of provisional application No. 60/046,522 filed May 15, 1997.

The present invention relates to a provisional application filed with the U.S. Patent Office on May 15, 1997, attorney docket AHBC 4609, by the same inventors and Assignee of interest as the present application. Furthermore, the present invention is related to U.S. Pat. No. 5,590,691, issued Jan. 7, 1997, entitled "Extruded Multiple Plastic Layer Coating Bonded To A Metal Tube", U.S. Pat. No. 5,566,720, issued Oct. 22, 1996, entitled "Elongated Fuel And Vapor Tube Having Multiple Layers And Method Of Making The Same", U.S. Pat. No. 5,524,673, issued Jun. 11, 1996, entitled "Multi-Layer Tubing Having Electrostatic Dissipation For Handling Hydrocarbon Fluids", and U.S. Pat. No. 5,383,087, issued Jan. 17, 1995, entitled "Multi-Layer Fuel And Vapor Tube" having the same Assignee of interest as this application, which are hereby incorporated within this specification by reference.

INTRODUCTION

The present invention relates to fluid connectors and, more particularly, to the sealing interconnection of such connectors with tubing end forms and, more particularly still, the use of spin welding to effect such interconnection.

BACKGROUND OF THE INVENTION

Quick connect couplings have been widely used in the U.S. Automobile industry for many years. Although applicable in numerous applications, quick connectors are typically employed in fuel systems and vapor recovery systems. The simplest and most cost effective design is the plastic housing female type quick connector releasably mated to a metal male tube endform. The opposite end of the female housing most typically defines a stem having a number of axially spaced barbs forms on the outer circumferential surface thereof and a nylon or plastic tubing endform pressed thereover. Such an arrangement is described in U.S. Pat. No. 5,542,712, issued Aug. 6, 1996, entitled "Quick Connector Housing With Elongated Barb resign".

In fluid handling systems, it is imperative that the connectors used have their male and female portions properly coupled together. A faulty connector enables an associated system to leak fluid. This can be particularly disadvantageous when the system is under pressure and the leaking connector expels the pressurized fluid. Furthermore, recent federal legislation has mandated significantly reduced hydrocarbon emissions from automotive fuel and vapor recovery systems. Conventional quick connectors, although effective to mechanically maintain tubing endforms in assembly with their associated connector bodies, have not adequately addressed the federal requirements. Also, the materials employed, typically nylon 12, do not provide sufficient resistance to the permeation of hydrocarbons therethrough.

The permeation problem has been addressed in part through the development of co-extruded multi-layer plastic tube containing two or more discreet layers of different types or formulations of plastic, one of which is specifically designed to provide an effective permeation layer, blocking the escape of hydrocarbons from the system. In general the most successful multi-layer tubing employs a relatively thick outer layer composed of a material resistant to the exterior environment. The innermost layer is thinner and is composed of a material which is chosen for its ability to block defusion of materials, such as hydrocarbons, alchohols and other materials present in fuel blends, to the outer layer and may have a degree of electrical conductivity sufficient to dissipate static charges generated by the flow of fluid therein. To date, it has been extremely difficult to obtain satisfactory lamination characteristics between dissimilar polymer layers. Thus, the use of one or more intermediate layers for bonding the inner aid outer layers has been proposed.

The use of multi-layer tubing in fuel related applications has been problematic inasmuch as the tubing endform necessarily exposes the lamina ends of the inner and outer layers as well as any intermediate layers to either the system fuels and vapors or the equally harsh exterior environment. Such exposure tends to degrade the bonding between the various layers, causing delamination or separation of the layers, resulting in loss of system integrity, fuel contamination and even blockage of fluid flow.

A related problem stems from dual aspects of commercially available quick connect devices, to wit: high volume and low sale price frequently necessitating the use of inexpensive, somewhat pliable materials, and complex contours of extremely small inter-fitting components. These aspects collectively increase the likelihood of misassembly. High volume production techniques, including automated assembly tends to aggravate the problem wherein misassembly or impermissible dimensional variations of the components is difficult to detect. Excessive dimensional tolerance stack-up can result in low pull-apart characteristics between the barbed stem and the plastic tube and produce leakage. Misassembly, such as failure to include a O-ring can also result in leakage. In the case of multi-layer tube, dimensional and/or adhesive problems can result in mechanical delamination upon insertion of the tube over the barbed, stem. Finally, mono-wall plastic tube or multi-layer structures with low hoop strength can relax over time or at elevated temperatures, resulting in leaking or weeping of fluid.

BRIEF DESCRIPTION OF THE INVENTION

It is an object of the present invention to provide a simple and inexpensive yet mechanically and environmentally robust connection between a tube endform and a connector body as well as an assembly that overcomes the shortcomings of the prior art described hereinabove.

The fluid connector is designed for spin welding connection with a tube. The connector includes a body which defines a through passage which interconnects a first opening which is adapted for receiving a mating conduit and a second opening which is adapted for receiving the tube. The second opening defines surfaces which sealingly engage both the outer and inner peripheral surfaces of the tube. This arrangement has the advantage of reliably sealing the tube endform with the connector body, preventing both fluid leakage and the incursion of environmental contaminants.

In the preferred embodiment of the invention, the fluid connector body defines opposed surfaces for simultaneously sealingly engaging outer and inner peripheral surfaces of the tube. This arrangement has the advantage of ensuring that the outer surface of the tube is sealingly engaged with the connector body and, separately, the inner surface of the tube is sealingly engaged with the connector body, thereby providing a redundant seal.

In the preferred embodiment of the invention, the fluid connector is used in combination with multi-layer tubing having the outer peripheral surface of the outer layer spin weldingly connected to the connector body and the inner peripheral surface of the inner layer separately spin weldingly connected to the connector body. This arrangement provides the advantage of ensuring a hermetic seal at the interface of the inner add outer layers and any intermediate layers of the multi-layered tube from both system fluids and environmental contaminants, thus preventing capillary adsorption into the interface and/or delamination.

According to another aspect of the invention, the connector body includes inner and outer flanges which extend from the body which are concentrically disposed about the second opening, the inner flange defining an outwardly facing welding surface and the outer flange defining an inwardly facing welding surface. The welding surfaces are convergingly tapered to self-center the connector body and tubing during the assembly process and to minimize flow passage restriction of the finalized assembly.

According to still another feature of the invention, the inner and outer flanges are beveled proximate the free ends thereof to, in combination with the tubing, form inner and outer flash traps to house flash generated during the spin welding process. This arrangement has the advantage of providing an aesthetically pleasing external appearance at the point of interface of the tube endform and the connector body and preventing flash from extending radially inwardly into the fluid stream to restrict its flow.

These and other features and advantages of this invention will become apparent upon reading the following specification which, along with the drawings, describe; and discloses preferred and alternative embodiments of the invention in detail.

A detailed description of the disclosed embodiments makes reference to the accompanying drawings.

BRIEF DESCRIPTION OF THE DRAWINGS

FIG. 1, is a cross-sectional view of a typical prior art quick corrector assembly;

FIG. 2, is a cross-sectional view, on an enlarged scale, of the preferred embodiment of the present invention in application;

FIG. 3, is a broken, cross-sectional view of a connector body, on an enlarged scale, of FIG. 2;

FIG. 4, is a cross-sectional view, on an enlarged scale, taken on lines IV—IV of FIG. 2;

FIG. 5, is a broken cross-sectional detail, on a greatly enlarged scale, of the assembly of FIG. 2 prior to spin welding of the tube endform into the connector body;

DETAILED DESCRIPTION OF THE PREFERRED AND ALTERNATIVE EMBODIMENTS

Figure 6:
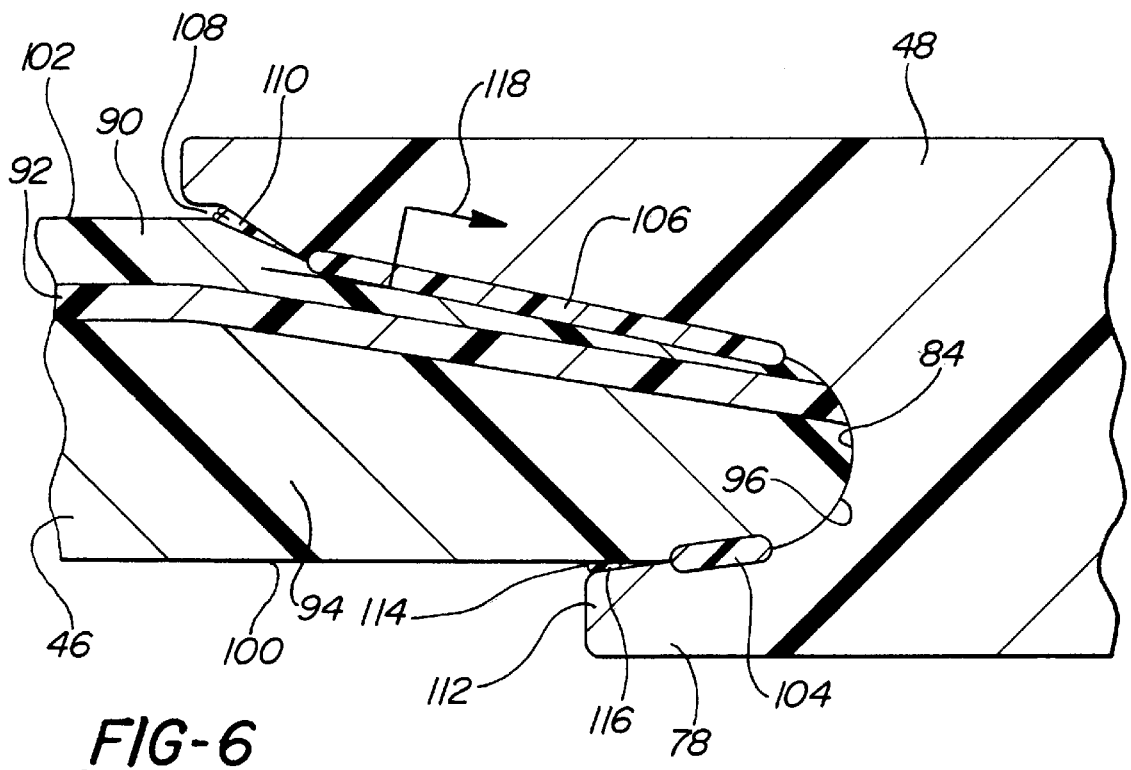
FIG. 6, corresponds with FIG. 5, showing the tube endform spin welded into the connector body.

Referring to FIG. 1, a typical prior art quick connector assembly 10 is illustrated in application wherein a connector 12 interconnects a steel tubing member end form 14 with a mono-wall plastic tube end form 16. An upset bead 18 displaced axially from the leading end 20 of steel tube 14 releasably engages a retainer 22 in assembly with connector 12 and is fluidically sealed therewith by a series of O-rings 24 in the usual manner.

The opposite end of connector 12 is formed as an elongated stem or nipple 26 having a plurality of axially spaced radially outwardly projecting barbs 28 formed therealong. Plastic end form 16 is slip fit over the outer surface of nipple 26. Plastic end form resiliently engages the sharp edges of barbs 28 to mechanically engage the two, while an O-ring 30 disposed within a radially outwardly opening recess 32 provides a seal between the internal diameter of plastic end form 16 and connector 12.

Referring to FIGS. 2, 3 and 4, the preferred embodiment of the present invention is illustrated in an application comprising a quick connector assembly 40 in which a connector 42 serves to interconnect a steel tubing member end form 44 and a multi-layer plastic tube end form 46 to effect a fluidic circuit, preferably for automotive application.

As best illustrated in FIG. 2, connector 42 comprises an assembly of a hard shell plastic connector body 48 formed of glass filled nylon or other suitable material in a generally tubular form having a stepped bore 50 therethrough, extending from a first opening 52 to a second opening 54.

Steel tubing member 44 extends through first opening 52 into bore 50. An upset bead 56, axially off set from a leading end 58 of steel tube 44 releasable engages a retainer 60 which is in assembly with body 48. The outer peripheral surface of steel tube 44 is sealingly engaged with body 48 within bore 50 by first and second resilient O-rings 62 and 64 separated by a spacer 66 and held in their illustrated position by a second spacer 68 and a top hat 70. As illustrated, the leading end 58 of steel tube 44 can be inserted within bore 50 and mechanically engage connector 42 without the use of tools or specialized assembly equipment. Steel tube 44 can be released from connector 42 by resiliently displacing retainer 60.

Connector body 48 is formed of plastic material with a sufficient carbon content or other suitable material to ensure a degree of electrical conductivity sufficient to permit the discharge of static charges generated by the flow of fluid through the system. An intermediate step portion 72 of bore 50 is dimensioned to ensure a slip fit with leading end 58 of steel tube 44 to establish intimate contact and a path of electrical conductivity therebetween as illustrated by arrow 74 (FIG. 2).

As best illustrated in FIG. 3, radially spaced concentric inner and outer flanges 76 and 78, respectively, are integrally formed with and extend axially leftwardly from the main portion of connector body 48. Inner flange 76 extends further than outer flange 78 and terminates at a leading nose 80. Flanges 78 and 80 are circular and concentric with second opening 54.

The radially outermost circumfrential surface of inner flange 76 has a first converging tapered portion 82 extending leftwardly from a root or base portion 84, transitioning into a more abrupt, second tapered portion 86, terminating in leading nose 80. First tapered portion 82 of the outer surface of inner flange 76 is deemed a first welding surface. The radially inwardmost surface of outer flange 78 is outwardly tapered extending from right to left in FIG. 3, defining a second welding surface 88. Thus, welding surfaces 82 and 88 are converging from left to right as viewed in FIG. 3.

Referring to FIG. 4, plastic tube end form 46 is illustrated in cross-section and constitutes a multi-layer structure containing an inner or first layer 90 at least one bonding or second layer 92 and an outer or third layer 94. The tube 46 of the present invention is, preferably, fabricated by co-extruding various compositions of thermo plastic materials in a conventional co-extrusion process. The tubing 46 of the present invention is a material which is suitable for use in motor vehicles and comprises a relatively thick outer layer 94 which is non-reactive with the external environment and can withstand various shocks, vibrational fatigue, and changes in temperature as well as exposure to various corrosive and degrading compounds to which it would be exposed through the normal course of operation in the motor vehicle. Suitable materials for use in the present invention may be composed of any melt-processable extrudable thermo plastic material which is resistant to ultra-violet degradation, extreme changes in heat and exposure to gasoline and its additives. The material of choice may also exhibit resistance to environmental hazards such as exposure to zinc chloride, and resistance to degradation upon contact with material such as engine oil and brace fluid. Inner and outer layers 90 and 94, respectively, are formed of suitable material such as nylon 12 which is compatible with the material selected for use in material forming connector body 48. Furthermore, inner layer 90 of plastic tube 46 is formulated with graphite or other suitable material rendering it electrically conductive sufficient to dissipate electrostatic charge developed by fluid moving through plastic tube 46.

Referring to FIGS. 5 and 6, the spin welding process of mounting plastic tube end form 46 on connector body 48 is illustrated. Referring specifically to FIG. 5, plastic tube 46 is pre-positioned concentrically with opening 54 and spaced slightly axially therefrom. The nominal inner diameter of plastic tube 46 is slightly greater than the maximum diameter of leading nose 80 to ensure that as plastic tube 46 contacts connector body 48, the leading edge 96 thereof will first contact second tapered portion 86 of inner flange 76 to preposition and self-center the two. The relatively abruptly tapered surface 86 acts to prevent inadvertent hand assembly of the tube 46 and connector 42 which could be mistaken for a welded joint and installed in a host system. The self-entering feature also eliminates the need for guide mandrels during spin welding.

As plastic tube 46 is axially pressed into engagement with connector body 48, tube 46 is mounted rigidly and connector body 48 is mounted for relative rotation therewith in a suitable press. Once a suitable speed differential is established, tube 46 and connector body 48 are axially pressed together as illustrated by arrow 98. As leading edge 96 of tube 46 contacts tapered portion 86, it tends to flare plastic tube 46 as it moves axially with respect to connector body 48 from the orientation and configuration shown in FIG. 5 to that of FIG. 6. When leading edge 96 of tube 46 contacts base portion 84 of connector body 48, all relative axial displacement and rotationally displacement ceases.

During the spin welding process, the outer surface 100 of outer layer 94 frictionally engages tapered portion 88 of outer flange 78 to melt the surfaces thereof to establish an outer weldment zone 104. Likewise, inner surface 102 of inner layer 90 frictionally engages tapered portions 82 and 86 of inner flange 76 to melt the respective portions thereof to create an inner weldment zone 106. The respective materials comingle and quickly reharden to establish continuous concentric weldments at zones 104 and 106 thereby hermetically sealing the intermediate portion of leading edge 96 which is radially intermediate weldment zones 104 and 106. This ensures that fluids being carried in the host system as well as external atmospheric contaminants are never exposed to the bonding or intermediate layers 92 of plastic tube 46.

The radially outwardmost extent of leading nose 80 is beveled or positioned radially inwardly of inner surface 102 of plastic tube 46 to create a trap 108 into which any excess material or flash 110 flows during the spin welding process. Trap 108 is dimensioned such that all flash 110 is contained therein and prevents excess flash from extended radially inwardly into bore 50 to obstruct the flow of fluid therethrough. Likewise, the radially inner most portion of the leading nose 112 of outer flange 78 is beveled or positioned radially outwardly of the outer surface 100 of the outer laser 94 of plastic tube 46 to establish a second trap 114 for receiving flash 116 created during the spin welding process when surface material from outer layer 94 and tapered surface 88 are momentarily in the molten state. Flash trap 114 is primarily intended for cosmetic purposes to prevent flash 116 from being externally visible. Noses 80 and 112 can also be formed as concentric skirts extending axially from flanges 76 and 78.

The various control perimeters in spin welding are generally well known, albeit in other applications. For the sake of brevity they will not be repeated here, reference being made to U.S. Pat. Nos. 2,933,428 to Mueller, 3,980,248 to Minoshima and 5,152,855 to Jansman et al.

The applicant deems it important to employ materials in the plastic tube and connector body that are compatible, particularly in melting temperature which will nit predictably as they solidify from the molten state established during this spin welding process. This produces a weldment with optimized structural integrity but also ensures a suitable electrically conductive path is established between the plastic tube and the connector body as illustrated by arrow 118, whereby static charge can pass freely from the tube through the connector body to the steel tubing 14. Once connected to ground potential, the system described herein dissipates all static charge developed as a consequence of fluid flow through plastic tube 46.

To date, the applicant has generated only limited empirical data which suggests that optimal control perimeters such as press speed, feed rate, pressure, boost, coast and braking cycles are widely variable depending upon the materials employed, the dimensions, of the connector assembly and mating tubing. However, optimization of the spin welding process for a given design is not deemed unduly burdensome given the substantial amount of general literature on the subject.

A perusal of the differences between the prior art quick connector assembly 10 of FIG. 1 and the preferred embodiment of the present invention in FIG. 2 will illustrate another advantage of the present invention. To ensure adequate pull-apart strength, conventional barbed nipple type connectors required a fairly long stem 26 having axial length of 3–4 times that of the nominal diameter of the mating mono-wall plastic tube 16. In the case of the present invention, weldments created between flanges 76 and 78 are strong enough to reduce their axial length to a dimension of less than the nominal diameter of the mating plastic tube 46. The resulting overall reduction in size provides significant packaging advantages for the end user.

Furthermore, empirical data suggests that only one weldment is necessary to provide adequate pull-apart strength. In fact, tests have shown that it can exceed the nominal tensile strength of the tubing itself. Accordingly, in the broadest sense, only one flange (76 or 78) must be actually welded to its mating tube layer (90 or 94) and the remaining (non welded) pair must only be in sealing engagement to isolate bonding layer 92. By way of example, only inner weldment zone 106 need be established between inner surface 102 of inner layer 90 and tapered portion (surface) 82 of inner flange 76, while outer surface 100 of outer layer 94 need only be in sealing engagement with adjacent surface 88 of outer flange 78. This permits outer flange to be dimensionally minimalized. Definitially, "peripheral surfaces" of the tube includes outer surface 100 and end surface 101 of outer layer 94 and inner surface 102 and end surface 103 of inner layer 90 of tube 46.

Figure 7:
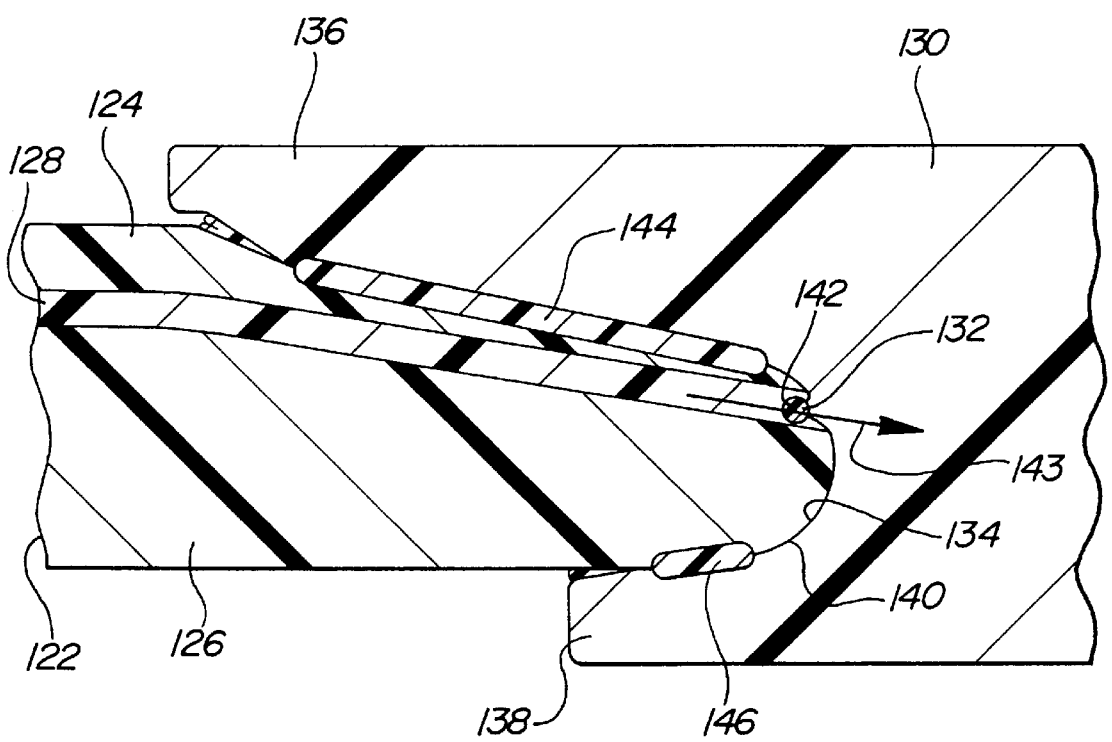
FIG. 7, is a cross-sectional view taken on a greatly enlarged scale of an alternative embodiment of the invention corresponding with FIG. 6.

Referring to FIG. 7, an alternative embodiment of the present invention is illustrated in an application where a multi-layer plastic tube end form 122 has inner and outer layers 124 and 126, respectively, formed of non-conductive material and an intermediate layer 128 constructed of conductive material. To ensure intimate contact between conductive layer 128 and connector body 130, an annular ridge 132 is integrally formed within base portion 134 of connector body 130 intermediate inner and outer flanges 136 and 138 respectively, and positioned and dimensioned to ensure alignment with intermediate layer 128 during the spin welding process. Annular ridge 132 contacts the leading edge 140 of plastic tube 122 during relative axially motion therebetween during spin welding to create a localized third or intermediate weldment zone 142, ensuring electrical conductivity therebetween as illustrated by arrow 143. Inner and outer weldment zones 144 and 146 are also created during the spin welding process as illustrated in FIG. 7 substantially in the same way as that described with respect to FIGS. 5 and 6.

It is to be understood that the invention has been described with reference to specific embodiments and variations to provide the features and advantages previously described and that the embodiments are susceptible of modifications as will become apparent to those skilled in the art. For example, the present invention can be applied to composite tubing structures such as those including non-plastic or metal layers such as described in U.S. Pat. Nos. 5,590,691 and 5,339,867. Accordingly, the foregoing is not to be construed in a limiting sense.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise tan as specifically described.

What is claimed:

1. In combination a fluid connector for spin welding connection with a tube having a generally planar end surface, said connector comprising a body defining a through passage interconnecting a first opening adapted for receiving a mating conduit and a second opening adapted for receiving said tube, said second opening defining radially opposed surfaces weldingly engaging outer and inner peripheral surfaces of said tube, said radially opposed surfaces extending circumferentially entirely around said second opening and axially converging, at least one of said radially opposed surfaces having a dual taper wherein one portion of said one radially opposed surface is disposed at a greater angle from a longitudinal axis of said second opening than an angle of a second portion of said one radially opposed surface.

2. The combination of claim 1, wherein said body is formed of electrically conductive plastic material.

3. The combination of claim 1, wherein said radially opposed surfaces are concentrically disposed about said second opening.

4. The combination of claim 1, wherein said fluid connector further comprises retainer means operative to releasably engage an abutment surface formed on said mating conduit.

5. The combination of claim 1, wherein said radially opposed surfaces are formed by outer and inner concentric flanges extending axially from said body.

6. The combination of claim 5, further comprising outer and inner concentric skirt structures extending axially outwardly from said outer and inner concentric flanges, respectively, to define weldment flash traps in cooperation with said outer and inner tube peripheral surfaces.

7. A fluid coupling comprising:
a connector body defining a through passage interconnecting a first opening adapted for engagingly receiving a tubing member and a second opening;
inner and outer flanges extending from said body and concentrically disposed about said second opening, said inner flange defining an outwardly facing welding surface and said outer flange defining an inwardly facing welding surface, at least one of said welding surfaces having a dual taper wherein one portion of said at least one welding surface is disposed at a greater angle from a longitudinal axis of said second opening than an angle of a second portion of said at least one welding surface; and
a tube endform including a generally planar end surface, an outer peripheral surface spin welded to said inwardly facing welding surface, and an inner peripheral surface spin welded to said outwardly facing welding surface.

8. The fluid coupling of claim 7, wherein said tube includes at least discrete inner and outer layers.

9. The fluid coupling of claim 8, wherein said tube includes an intermediate layer.

10. The fluid coupling of claim 9, wherein said intermediate layer is environmentally isolated from fluid within said coupling by a first weldment interconnecting the inner layer, with the inner flange and from atmospheric, contaminants by a second weldment interconnecting the outer layer with the outer flange.

11. The fluid coupling of claim 10, wherein at least one of said weldments effects an electrically conductive path between said tube and connector body.

12. The fluid coupling of claim 7, wherein said coupling further comprises means operative to establish an electrically conductive path between said connector body and a tubing member.

13. The fluid coupling of claim 8, wherein said connector body flanges and said inner and outer tubing layers are formed of plastic material.

14. The fluid coupling of claim 8, wherein said connector body and at least one of said tubing layers is electrically conductive.

15. The fluid coupling of claim 7, wherein said connector body and at least portion of said tube endform are formed of weldably compatible material.

16. The fluid coupling of claim 15, wherein said materials have similar melting temperatures.

* * * * *